United States Patent
Wang et al.

(10) Patent No.: US 12,222,860 B2
(45) Date of Patent: Feb. 11, 2025

(54) PROCESSOR AND METHOD DESIGNATING AN IN-CORE CACHE OF A HIERARCHICAL CACHE SYSTEM TO PERFORM WRITING-BACK AND INVALIDATION OF CACHED DATA

(71) Applicant: Shanghai Zhaoxin Semiconductor Co., Ltd., Shanghai (CN)

(72) Inventors: Weilin Wang, Beijing (CN); Yingbing Guan, Shanghai (CN); Yue Qin, Shanghai (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 0 days.

(21) Appl. No.: 18/308,893

(22) Filed: Apr. 28, 2023

(65) Prior Publication Data
US 2023/0401153 A1 Dec. 14, 2023

(30) Foreign Application Priority Data
Jun. 8, 2022 (CN) .......................... 202210644875.X (51) Int. Cl.
*G06F 12/08* (2016.01)
*G06F 12/0811* (2016.01)
(Continued)

(52) U.S. Cl.
CPC ...... *G06F 12/0811* (2013.01); *G06F 12/0875* (2013.01); *G06F 12/0891* (2013.01); *G06F 2212/452* (2013.01)

(58) Field of Classification Search
CPC ............. G06F 12/0811; G06F 12/0875; G06F 12/0891; G06F 2212/452; G06F 12/0897;
(Continued)

(56) References Cited

U.S. PATENT DOCUMENTS

| 11,971,821 B2 | 4/2024 | Wang |
| 2012/0005433 A1 | 1/2012 | Thilagar |

(Continued)

FOREIGN PATENT DOCUMENTS

CN 114064517 A 2/2022

*Primary Examiner* — Hua J Song
(74) *Attorney, Agent, or Firm* — McClure, Qualey & Rodack, LLP (57) ABSTRACT

A processor and a method for designating an in-core cache of a hierarchical cache system to perform writing-back and invalidation of cached data are shown. In response to an instruction that is in the instruction set architecture and is executed to designate a designated-level cache within the current core as a target to perform writing-back and invalidation, a decoder of the current core outputs microinstructions. According to the microinstructions, a level-designation request indicating the designated-level cache within the current core is transferred to the hierarchical cache system through the memory order buffer. In response to the level-designation request, the hierarchical cache system recognizes cache lines related to the designated-level cache of the current core, writes modified cache lines (which are obtained from the recognized cache lines) back to the system memory, and then invalidates all the recognized cache lines from the hierarchical cache system.

24 Claims, 9 Drawing Sheets

(51) Int. Cl.
*G06F 12/0875* (2016.01)
*G06F 12/0891* (2016.01)

(58) Field of Classification Search
CPC ............. G06F 12/0808; G06F 12/0831; G06F 12/0877; Y02D 10/00
USPC ........................................................ 711/122
See application file for complete search history.

(56) References Cited

U.S. PATENT DOCUMENTS

2020/0201638 A1\* 6/2020 Gerzon ............... G06F 12/0857
2022/0012175 A1\* 1/2022 Ishii ..................... G06F 12/126

\* cited by examiner

| Memory Address | L1 of core_1 |
|---|---|
| 0x800F00 | M |
| 0x801000 | I |
| ... | ... |

| Memory Address | LLC | core_1 | core_2 | core_3 | core_4 |
|---|---|---|---|---|---|
| 0x800F00 | S | S | S | I | I |
| 0x801000 | M | M | I | I | I |
| ... | ... | ... | ... | ... | ... |

PROCESSOR AND METHOD DESIGNATING AN IN-CORE CACHE OF A HIERARCHICAL CACHE SYSTEM TO PERFORM WRITING-BACK AND INVALIDATION OF CACHED DATA

CROSS REFERENCE TO RELATED APPLICATIONS

This application claims priority of China Patent Application No. 202210644875.X, filed on Jun. 8, 2022, the entirety of which is incorporated by reference herein.

BACKGROUND

Technical Field

The present application relates to the management of a hierarchical cache system.

Description of the Related Art

Memory devices in a computer system are configured to form a hierarchical architecture. The upper-tier memory devices have the higher speed, lower latency, but smaller capacity. The memory hierarchy of most computer systems has the following four tiers (from the upper tier to the lower tier): registers; caches; a system memory (a main memory, such as a DRAM); and disks (SSD or HD).

In particular, the caches may be further classified hierarchically. Ranked by access speed (fastest to slowest), a hierarchical cache system includes: the first-level cache (L1), the second-level cache (L2), and the third-level cache (L3, also named the last-level cache, or LLC for short). The management of such a hierarchical cache system significantly affects system performance.

How to effectively manage a hierarchical cache system is an important issue in processor design.

BRIEF SUMMARY

The present application proposes a management technology for a hierarchical cache system.

A processor in accordance with an exemplary embodiment of the present application includes a first core, and a last-level cache coupled to the first core. The first core has a microcode storage device, a decoder, a memory order buffer (MOB), a first-level cache (L1), and a second-level cache (L2). The first-level cache and the second-level cache of the first core, the last-level cache, and the in-core caches of the other cores of the processor form a hierarchical cache system. The last-level cache is shared by the different cores of the processor. In response to an instruction that is in the instruction set architecture (ISA) and is executed to designate a designated-level cache within the current core as a target to perform writing-back and invalidation, the decoder outputs microinstructions based on microcode stored in the microcode storage device. According to the microinstructions, a level-designation request indicating the designated-level cache within the first core is transferred to the hierarchical cache system through the memory order buffer. In response to the level-designation request, the hierarchical cache system recognizes cache lines related to the designated-level cache of the first core, writes modified cache lines (which are obtained from the recognized cache lines) back to the system memory, and then invalidates all the recognized cache lines from the hierarchical cache system.

In an exemplary embodiment, the instruction designates the first-level cache (without the second-level cache) of the current core as the designated-level cache.

In an exemplary embodiment, the instruction designates the first-level cache and the second-level cache of the current core as the designated-level cache.

In another exemplary embodiment, a method for performing writing-back and invalidation of cached data by designating an in-core cache of a hierarchical cache system is shown. According to the method, a first core of a processor operates to execute an instruction, wherein the instruction is in the instruction set architecture (ISA) and is executed to designate a designated-level cache within the current core as a target to perform writing-back and invalidation. The hierarchical cache system includes a first-level cache and a second-level cache of the first core, a last-level cache provided within the processor, and in-core caches of the other cores of the processors. The last-level cache is shared by the different cores of the processor. According to the method, a decoder of the first core decodes the instruction into microinstructions based on the microcode stored in a microcode storage device. According to the microinstructions, the method transfers a level-designation request to the hierarchical cache system through a memory order buffer of the first core, wherein the level-designation request indicates the designated-level cache of the first core. In response to the level-designation request, the hierarchical cache system operates to recognize cache lines related to the designated-level cache of the first core, write modified cache lines (which are obtained from the recognized cache lines) back to a system memory, and then invalidate all the recognized cache lines from the hierarchical cache system.

A detailed description is given in the following embodiments with reference to the accompanying drawings.

BRIEF DESCRIPTION OF THE DRAWINGS

The present application may be more fully understood by reading the subsequent detailed description and examples with references made to the accompanying drawings, wherein.

DETAILED DESCRIPTION

The following description is made for the purpose of illustrating the general principles of the application and should not be taken in a limiting sense. The scope of the application is best determined by reference to the appended claims.

This paper specifically discusses writing back and invalidation of cached data in a hierarchical cache system. Traditionally, the last-level cache (LLC) shared by multiple cores is regarded as the target to be written back to a system memory and entirely invalidated from the entire hierarchical cache system. Among the cache lines involved by the last-level cache (LLC), the modified cache lines have to be updated to the system memory first. Then, no matter modified or not, all cache lines involved by the last-level cache (LLC) are invalidated from the entire hierarchical cache system. The invalidation is performed over the in-core caches of all cores of the processor as well as the last-level cache (LLC) shared by the different cores. According to another traditional technique, the writing-back and invalidation of cached data is performed in units of cache lines, to process one single cache line each time. If the designated cache line has been modified, it must be written back to the system memory first, and then, no matter modified or not, the designated cache line is invalidated from the hierarchical cache system (invalidated from every in-core cache of the different cores, and also invalidated from the LLC shared by the different cores). However, the traditional writing-back and invalidation techniques for cached data are not suitable for all applications.

For example, in a multi-core processor, when a cache vulnerability appears, the software needs to write back and invalidate the data cached in the in-core caches of the current core, but it is not necessary to flush the data exclusively cached in the other cores. Such a situation is not solved by the traditional technologies. When the last-level cache (LLC) shared by the multiple cores is regarded as the target for writing-back and invalidation, the execution speed of the other cores will be affected. When performing writing-back and invalidation in units of cache lines, complex software calculations are required to correctly designate the expected cache lines for writing-back and invalidation. The software may judge wrongly and result in redundant writing-back and invalidation.

The solution introduced in this paper regards a designated-level cache within the current core as a target for writing-back and invalidation of cached data. In an exemplary embodiment, the designated-level cache is the first-level cache L1 of the current core. In another exemplary embodiment, the designated-level cache includes the first-level cache L1 and the second-level cache L2 of the current core. By focusing the writing-back and invalidation on the designated-level cache, the performance of the other cores is not affected, and redundant writing-back and invalidation is avoided.

Figure 1:
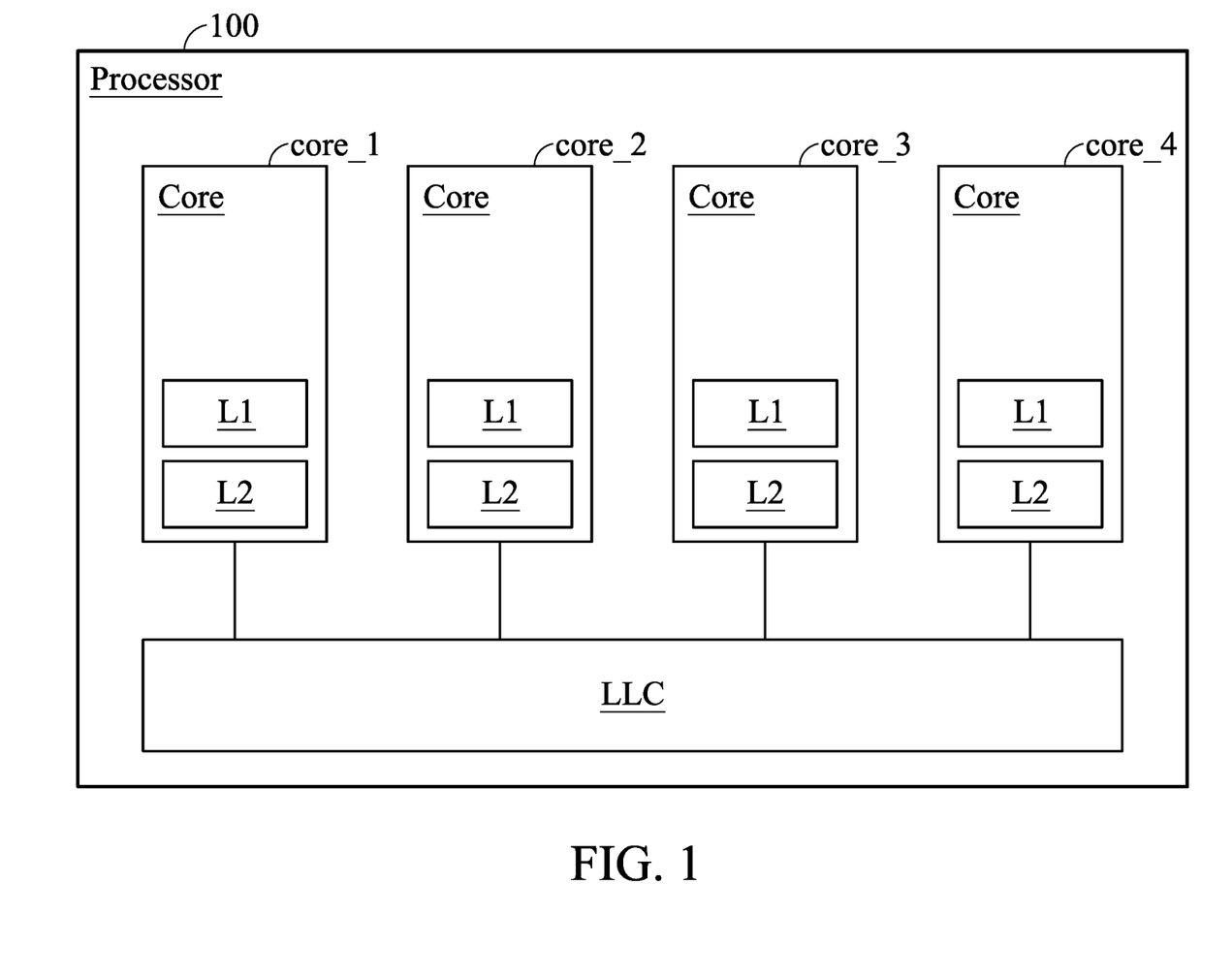
FIG. 1 illustrates a multi-core processor 100 in accordance with an exemplary embodiment of the present application, which includes four cores core_1, core_2, core_3 and core_4.

FIG. 1 illustrates a multi-core processor 100 in accordance with an exemplary embodiment of the present application, which includes four cores core_1, core_2, core_3 and core_4. The core core_1 may simply designate its first-level cache L1 as the target for writing-back and invalidation of cached data. The cache lines related to the first-level cache L1 of the first core core_1 and in the status 'M' (the modified status) are written back to the system memory first. Then, regardless of the cache status ('M' status or not), all cache lines related to the first-level cache L1 of core core_1 are completely invalidated from the entire hierarchical cache system (invalidated from the first-level caches L1 and the second-level caches L2 of all cores core_1-core_4, and invalidated from the last-level cache LLC shared by the different cores core_1-core_4).

In another exemplary embodiment, the core core_1 may designate its first-level cache L1 and second-level cache L2 both as the target for writing-back and invalidation of cached data. That is, the writing-back and invalidation is performed on the entire in-core cache structure of the core core_1. The 'M' status cache lines related to the first-level cache L1 or the second-level cache L2 are written back to the system memory first. Then, regardless of the cache status ('M' status or not), the cache lines related to the first-level cache L1 or the second-level cache L2 of the core core_1 are completely invalidated from the hierarchical cache system (invalidated from the first-level caches L1 and second-level caches L2 of all cores core_1-core_4, and invalidated from the last-level cache LLC shared by the different cores core_1-core_4). The other cores core_2-core_4 may have the same writing-back and invalidation capability as the core core_1.

Processors in accordance with an exemplary embodiment of the present application introduce instructions of the Instruction Set Architecture (ISA) for the forgoing functions. The Instruction Set Architecture (ISA) supported by the proposed processor is not limited, and may be an x86 architecture, an Advanced RISC Machine (abbreviated ARM) architecture, or others.

In an exemplary embodiment, a processor is shown, which introduces an ISA instruction L1_WBINVD. The core executing the instruction L1_WBINVD regards its own first-level cache L1 as the target for writing-back and invalidation of cached data. Before being invalidated, note that the cache lines related to the first-level cache L1 of the current core and in the status "M" (the modified status) have to be written back to the system memory.

In another exemplary embodiment, the proposed processor introduces another ISA instruction CORE_WBINVD. The core executing the instruction CORE_WBINVD regards its first-level cache L1 and second-level cache L2 both as the target for writing-back and invalidation of cached data. Before being invalidated, note that the cache lines related to the first-level cache L1 or the second-level cache L2 of the current core and in the status "M" (the modified status) have to be written back to the system memory.

In another exemplary embodiment, the proposed processor introduces another ISA instruction Li_WBINVD. The functions of the aforementioned instruction L1_WBINVD or CORE_WBINVD are selected though the operand setting of the instruction Li_WBINVD. When the operand is set to select the first-level cache L1 as the target, the instruction Li_WBINVD works as the instruction L1_WBINVD. When the operand is set to select the first-level cache L1 and the second-level cache L2 both as the target, the instruction Li_WBINVD works as the instruction CORE_WBINVD. Instructions filling in the registers/system memory/immediate numbers may be coded prior to the instruction Li_WBINVD for operand setting. In some other processors, a more complex ISA instruction is introduced, which includes not only the writing-back and invalidation function executed through the instruction L1_WBINVD/CORE_WBINVD but also includes the preparatory procedures required for executing the instruction L1_WBINVD/CORE_WBINVD. Such an instruction also falls within the scope of the present application.

In some exemplary embodiments, microcode (ucode) of the processor may have modifications corresponding to these instructions (e.g., L1_WBINVD, CORE_WBINVD, Li_WBINVD, or others), and modifications may be also found in the processor hardware.

Figure 2:
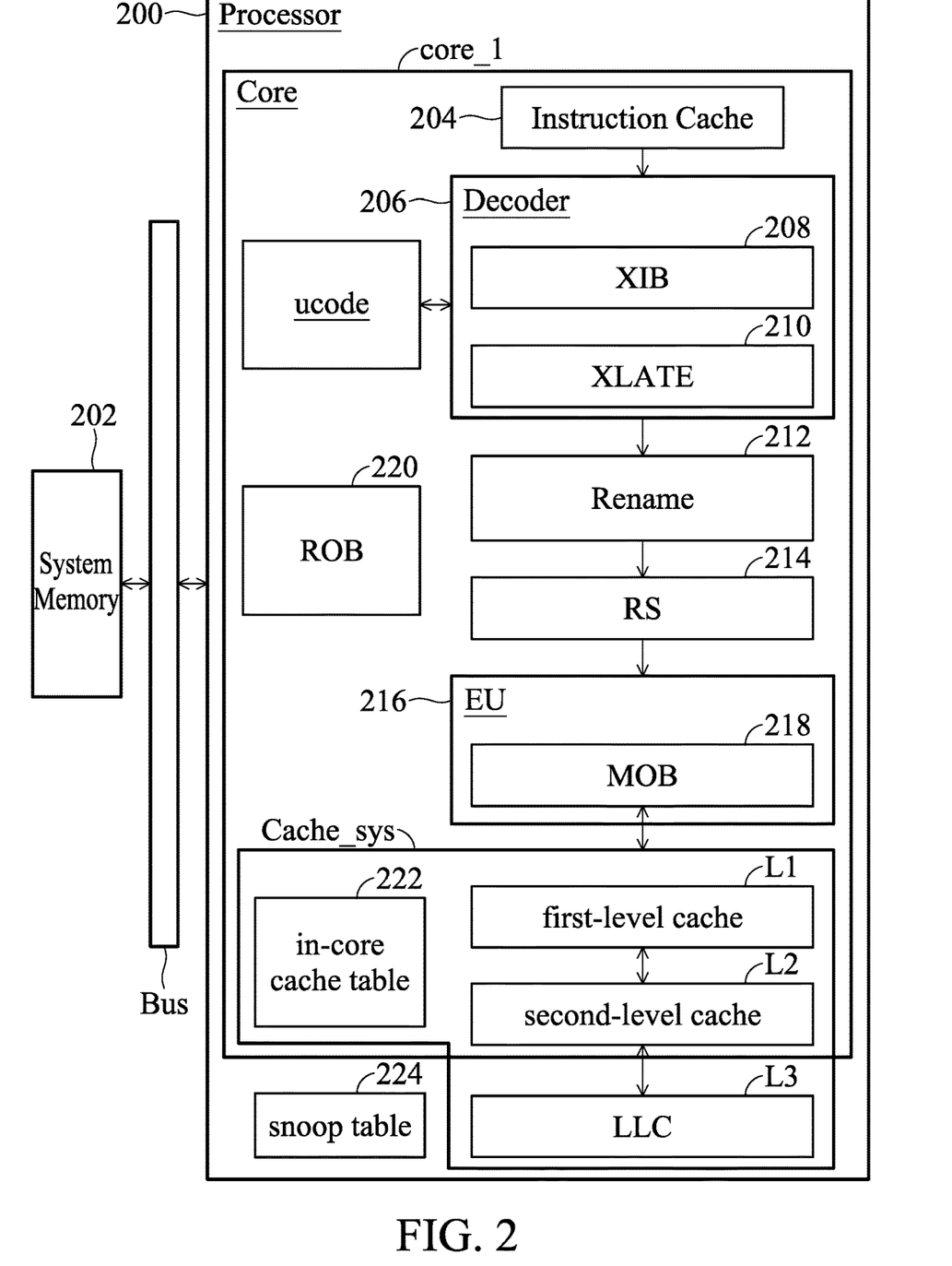
FIG. 2 is a block diagram illustrating a processor 200 and a core core_1 thereon in accordance with an exemplary embodiment of the present application.

FIG. 2 is a block diagram illustrating a processor 200 and a core core_1 thereon in accordance with an exemplary embodiment of the present application. The illustrated hierarchical cache system Cache_sys includes a first-level cache L1, a second-level cache L2, and a last-level cache (LLC) L3. The first-level cache L1 and the second-level cache L2 are in-core caches of the core core_1. In a multi-core processor, the last-level cache (LLC) L3 is shared by multiple cores (as shown in FIG. 1). The hierarchical cache system Cache_sys further includes in-core caches of the other cores (e.g., the first-level caches L1 and the second-level caches L2 of the other cores core_2-core_4).

A section of instructions is first loaded into an instruction cache 204 from a system memory 202 via a bus (Bus), and then is decoded by a decoder 206. The decoder 206 includes an instruction buffer (XIB for short) 208 and an instruction translator (XLATE for short) 210. From the instruction buffer (XIB) 208, the instructions proposed in the present application (e.g., L1_WBINVD, CORE_WBINVD, Li_WBINVD, or others) are recognized. Based on the microcode (ucode, stored in a microcode storage device), the instruction translator (XLATE) 210 translates the recognized instructions (e.g., L1_WBINVD, CORE_WBINVD, Li_WBINVD, or others) into to microinstructions to operate the pipelined hardware. The core core_1 operates a register renaming module (Rename for short) 212 to process these microinstructions, and operates a reservation station (RS) 214 to send (out of order) the renamed microinstructions to the execution unit (EU) 216. Through a memory order buffer (MOB) 218, the cached data in the designated-level cache (simply L1, or both of L1 and L2) within the core core_1 is targeted for writing-back to the system memory to 202 and invalidated from the whole hierarchical cache system Cache_Sys (including L1 and L2 of core core_1, in-core caches of the other cores, and L3). The microinstructions that have been executed (out of order) will wait in a re-order buffer (ROB for short) 220 to be retired (in order).

Based on the forgoing hardware actions, the microinstructions decoded from the instruction L1_WBINVD aim at the cached data of the first-level cache L1 of the core core_1 through the memory order buffer (MOB) 218, for writing-back and invalidation of cached data. Obtained from the aimed cache lines, the cache lines with the "M" status are written back to the system memory 202 through the bus (Bus). Then, no matter modified or not (at the "M" status or not), all cache lines related to the first-level cache L1 are completely invalidated from the entire hierarchical cache system Cache_sys (completely invalidated from L1 and L2 of core core_1, in-core caches of the other cores, and L3).

Based on the forgoing hardware actions, the microinstructions decoded from the instruction CORE_WBINVD aim at the cached data of the first-level and the second-level caches L1 and L2 of the core core_1 (i.e. the entire in-core cache structure of the core core_1) through the memory order buffer (MOB) 218, for writing-back and invalidation of cached data. Obtained from the aimed cache lines, the cache lines with the "M" status are written back to the system memory 202 through the bus (Bus). Then, no matter modified or not (at the "M" status or not), all cache lines related to the first-level cache L1 or the second-level cache L2 are completely invalidated from the entire hierarchical cache system Cache_sys (completely invalidated from L1 and L2 of core core_1, in-core caches of the other cores, and L3).

Based on the forgoing hardware actions, the microinstructions decoded from the instruction Li_WBINVD aim at the cached data of a designated-level cache through the memory order buffer (MOB) 218, for writing-back and invalidation of cached data. Obtained from the aimed cache lines, the cache lines with the "M" status are written back to the system memory 202 through the bus (Bus). Then, no matter modified or not (at the "M" status or not), all cache lines related to the designated-level cache are completely invalidated from the entire hierarchical cache system Cache_sys (completely invalidated from L1 and L2 of core core_1, in-core caches of the other cores, and L3).

The present application may search a table for cached status of the data cached in the designated-level cache. The table may be recorded in an internal storage area of the current core (referring to the in-core cache table 222 that is recorded in the hierarchical cache system Cache_sys for the cache statuses of the cache lines related to the in-core caches L1 and L2 of the core core_1). In another exemplary embodiment, the table is recorded in a storage area outside the cores (referring to the snoop table 224 that is updated to show, for each cache line, the cache statuses in the different caches (including the in-core caches of all cores, and the last-level cache shared by the all cores) of the hierarchical cache system Cache_sys.

Figure 3A:
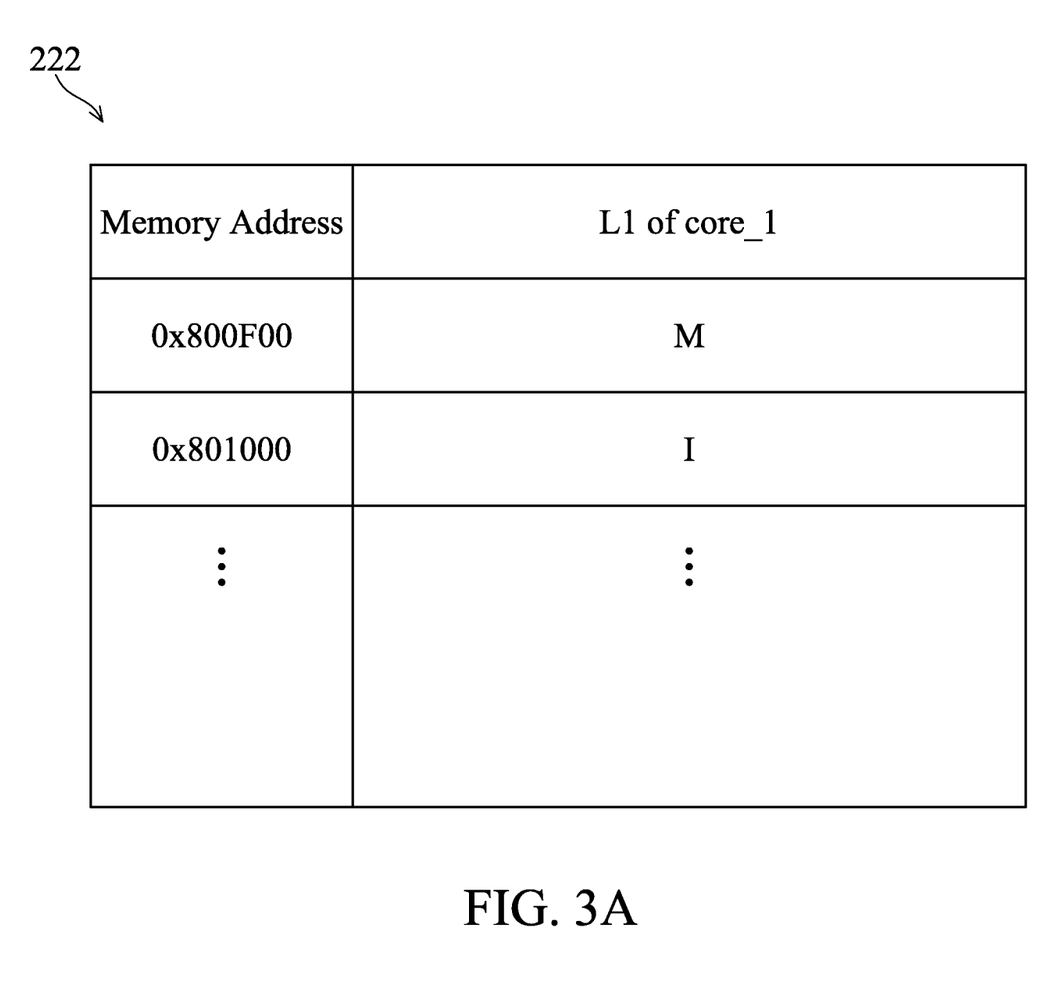
FIG. 3A illustrates an example of the in-core cache table 222, which lists the cache status in the first-level cache L1 of the core core_1 for each memory address, wherein each memory address represent one cache line.

FIG. 3A illustrates an example of the in-core cache table 222, which lists the cache status in the first-level cache L1 of the core core_1 for each memory address, wherein each memory address represent one cache line. "M" represents the modified status, "I" represents the invalid status, "E" represents the exclusive status, and "S" represents the multi-core shared status. In the other cores (referring to core_2-core_4 of FIG. 1), each core may have an individual in-core cache table updated for its own first-level cache L1.

Figure 3B:
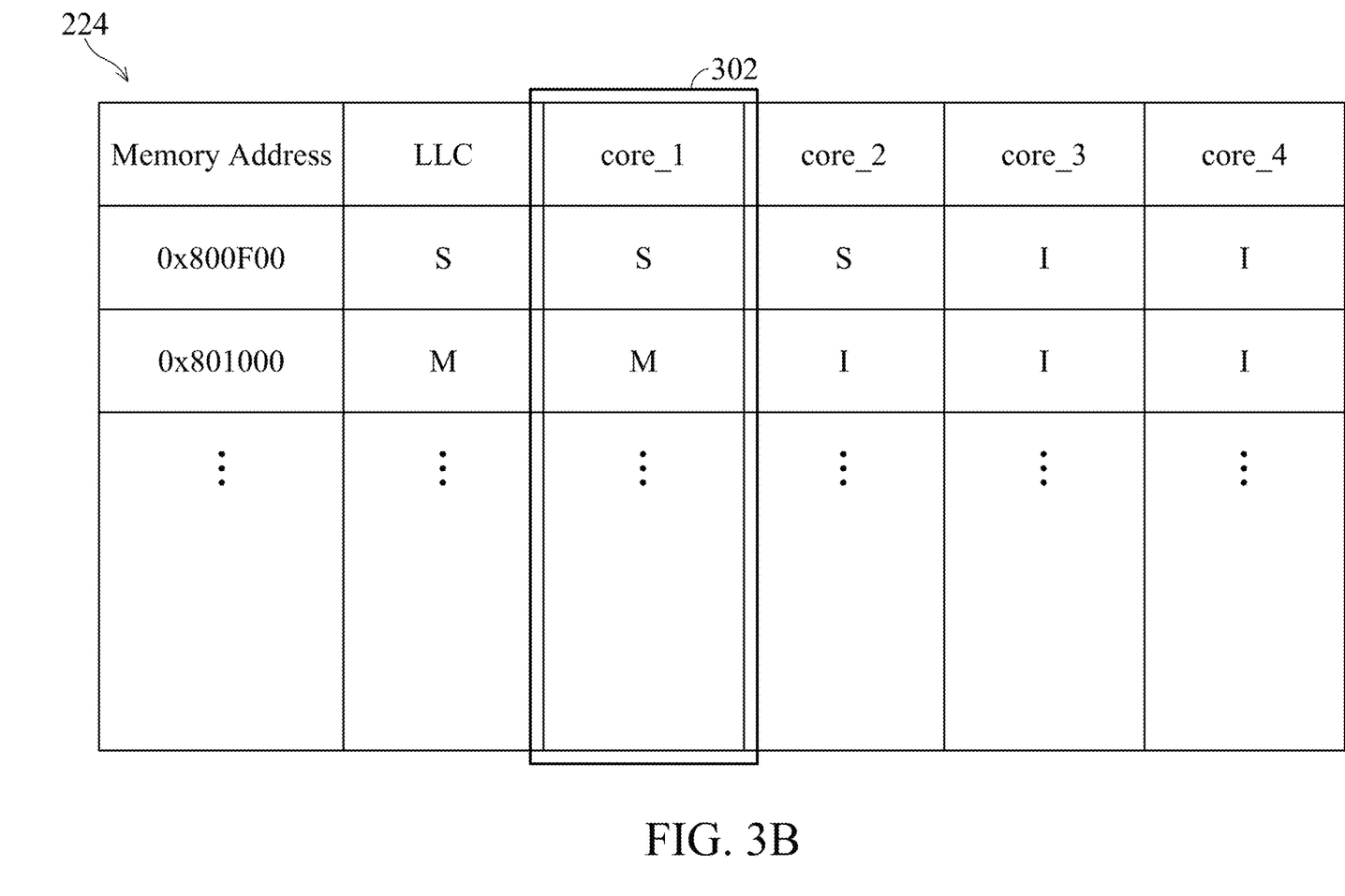
FIG. 3B illustrates an example of the snoop table 224, which lists the cache statuses in each level of caches for each memory address, wherein each memory address represent one cache line

FIG. 3B illustrates an example of the snoop table 224, which lists the cache statuses in each level of caches for each memory address, wherein each memory address represent one cache line. As shown, the cache statuses in the last-level cache LLC/L3 and the different cores core_1-core_4 are separately recorded. "M" represents the modified status, "I" represents the invalid status, "E" represents the exclusive status, and "S" represents the multi-core shared status. For example, referring to the column 302, it shows that in the core core_1, there is a multi-core shared cache line of a memory address 0x800F00, and a cache line of a memory address 0x801000 in the "M" status.

The following describes in detail how the microinstructions decoded from the instruction L1_WBINVD (or CORE_WBINVD, or Li_WBINVD, or other instructions designed for the similar function) of the present application operates the hardware, and uses the table consulting technique.

First, the instruction L1_WBINVD (or other, similar instructions) is discussed, which simply regards the cached data in the first-level cache L1 of the current core as the target for writing back and invalidation.

Figure 4:
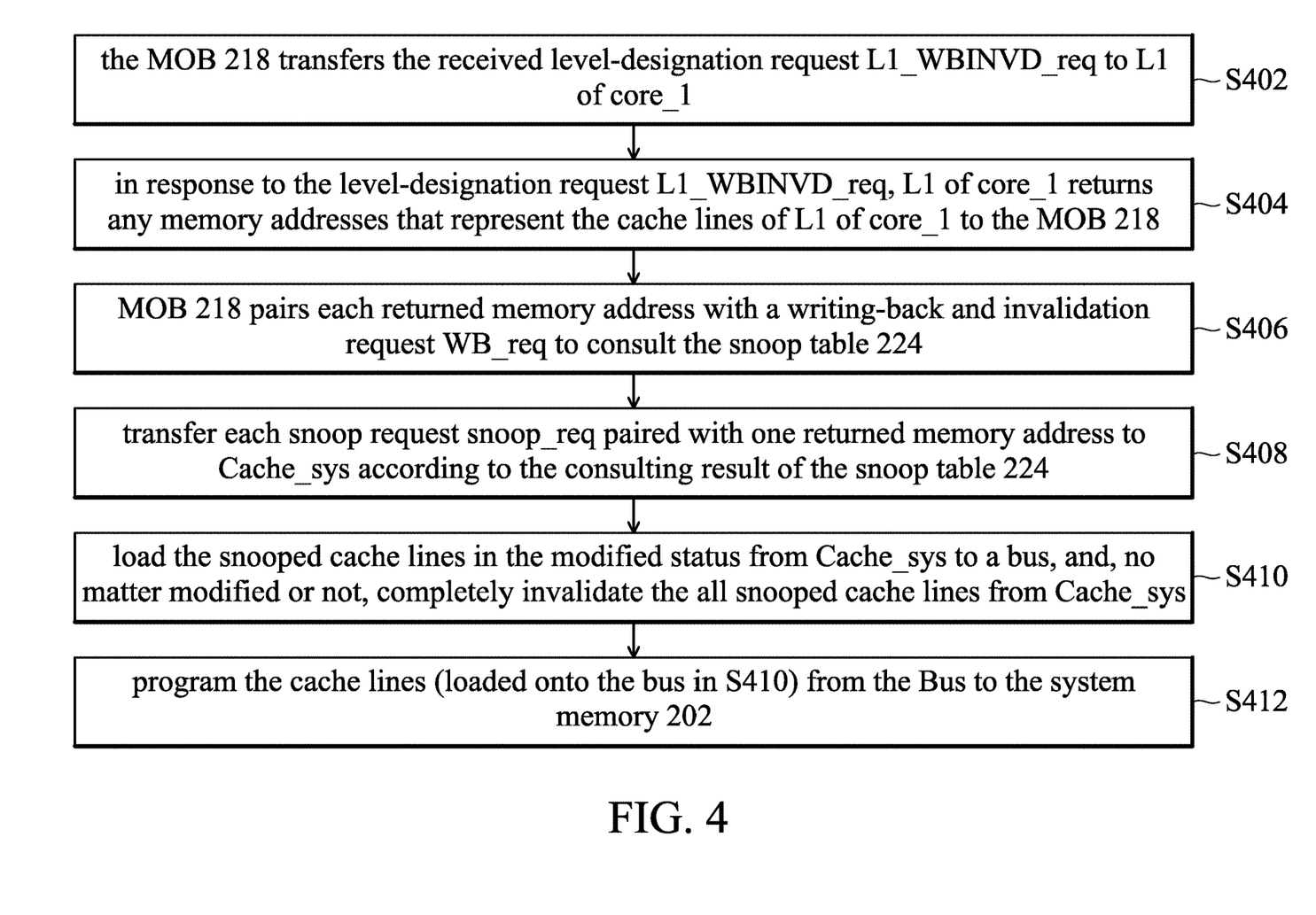
FIG. 4 is a flow chart illustrating a procedure that includes consulting a snoop table 224, for the execution of the instruction L1_WBINVD (or other, similar instructions)

FIG. 4 is a flow chart illustrating a procedure including consulting a snoop table 224 for the execution of the instruction L1_WBINVD (or other, similar instructions). The microinstruction decoded from this instruction L1_WBINVD includes issuing a level-designation request L1_WBINVD_req. In the following discussion with reference to FIG. 2, the current core that initiates the instruction is the core core_1 shown in FIG. 2.

In step S402, the memory order buffer (MOB) 218 transfers the received level-designation request L1_WBINVD_req to the first-level cache L1 of the core core_1.

In step S404, in response to the level-designation request L1_WBINVD_req, the first-level cache L1 of the core core_1 returns any memory addresses that represent the cache lines of the first-level cache L1 of the core core_1 to the memory order buffer (MOB) 218.

In step S406, the memory order buffer (MOB) 218 pairs each returned memory address with a writing-back and invalidation request WB_req to consult the snoop table 224.

The snoop table 224 (as shown in FIG. 3B) records the cache statuses in the entire hierarchical cache system Cache_sys for the different memory addresses. After each memory address returned in step S404 is paired with a writing-back and invalidation request WB_req to query the snoop table 224 according to step S406, the cache statuses in the hierarchical cache system Cache_sys corresponding to the queried memory addresses may be obtained. In step S408, each memory address is further paired with a snoop request snoop_req, to be transferred to the hierarchical cache system Cache_sys according to the consulting result of the snoop table 224.

In step S410, the snooped cache lines in the modified status ('M' status) are loaded from the hierarchical cache system Cache_sys to a bus. Furthermore, no matter modified or not, the all snooped cache lines are completely invalidated from the hierarchical cache system Cache_sys (completely invalidated from the in-core caches of all cores and completely invalidated from the last-level cache L3 shared by the different cores).

In step S412, the cache lines loaded onto the bus (Bus) in step S410 are further programmed from the bus (Bus) to the system memory 202.

According to the procedure illustrated in FIG. 4, the cache lines of the first-level cache memory L1 of the core core_1 are recognized, and they are looked up in the snoop table 224. For each cache line, the snoop table 224 records its cache status in the different caches of the hierarchical cache system Cache_sys. According to the snoop requests snoop_req issued to snoop the hierarchical cache system Cache_sys, writing-back and invalidation is performed on the cached lines related to the first-level cache L1 of the core core_1. In particular, the order of the foregoing steps may be exchanged for performance reasons.

Figure 5:
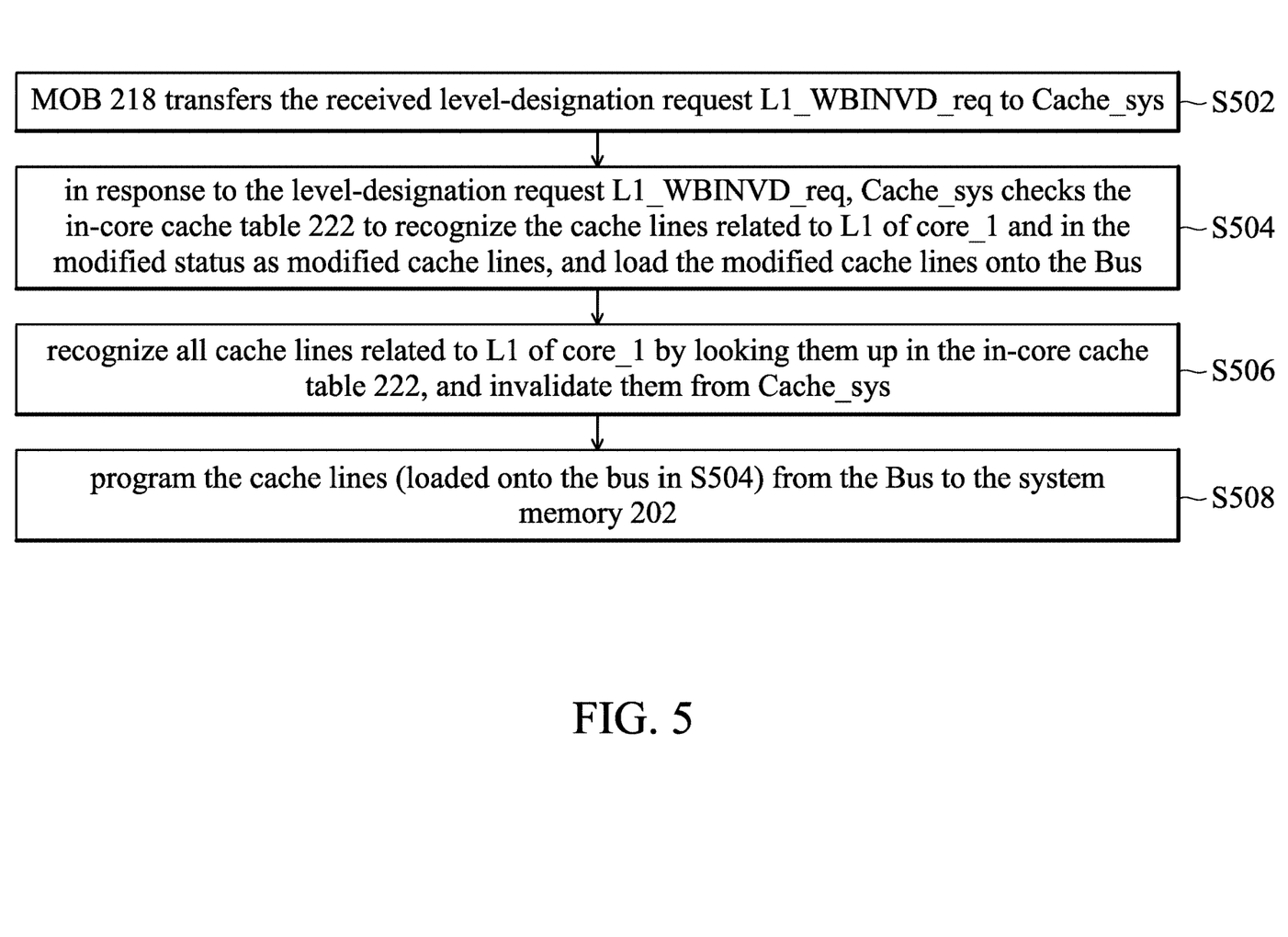
FIG. 5 is a flow chart illustrating a procedure that includes consulting an in-core cache table 222, for the execution of the instruction L1_WBINVD (or other, similar instructions)

FIG. 5 is a flow chart illustrating a procedure that includes consulting an in-core cache table 222 for the execution of the instruction L1_WBINVD (or other, similar instructions). Similar to that described in FIG. 4, the microinstruction decoded from this instruction L1_WBINVD includes issuing a level-designation request L1_WBINVD_req. In the following discussion with reference to FIG. 2, the current core that initiates the instruction is the core_1 shown in FIG. 2.

In step S502, the memory order buffer (MOB) 218 transfers the received level-designation request L1_WBINVD_req to the hierarchical cache system Cache_sys.

In step S504, in response to the level-designation request L1_WBINVD_req, the hierarchical cache system Cache_sys checks the in-core cache table 222. The in-core cache table 222 (as shown in FIG. 3A) records for each cache line the cache status in the first-level cache L1 of the core core_1. By looking it up in the in-core cache table 222, the cache lines related to the first-level cache L1 of the core core_1 and in the modified status ('M' status) are recognized in step S504 as modified cache lines. Step S504 further loads the modified cache lines onto the bus (Bus).

In step S506, all cache lines, determined as being related to the first-level cache L1 of the core core_1 by looking them up in the in-core cache table 222, are invalidated from the whole hierarchical cache system Cache_sys (they are completely invalidated from all in-core caches of the different cores, and completely invalidated from the last-level cache L3 shared by the different cores).

In step S508, the cache lines loaded onto the bus (Bus) in step S504 are further programmed from the bus (Bus) to the system memory 202.

Based on the cache status recorded in the in-core cache table 222 for each cache line related to the first-level cache L1 of the core core_1, the procedure illustrated in FIG. 5 recognizes all cache lines related to the first-level cache L1 of the core core_1 and, accordingly, performs writing-back and invalidation on the cache lines related to the first-level cache L1 of the core core_1.

Figure 6A:
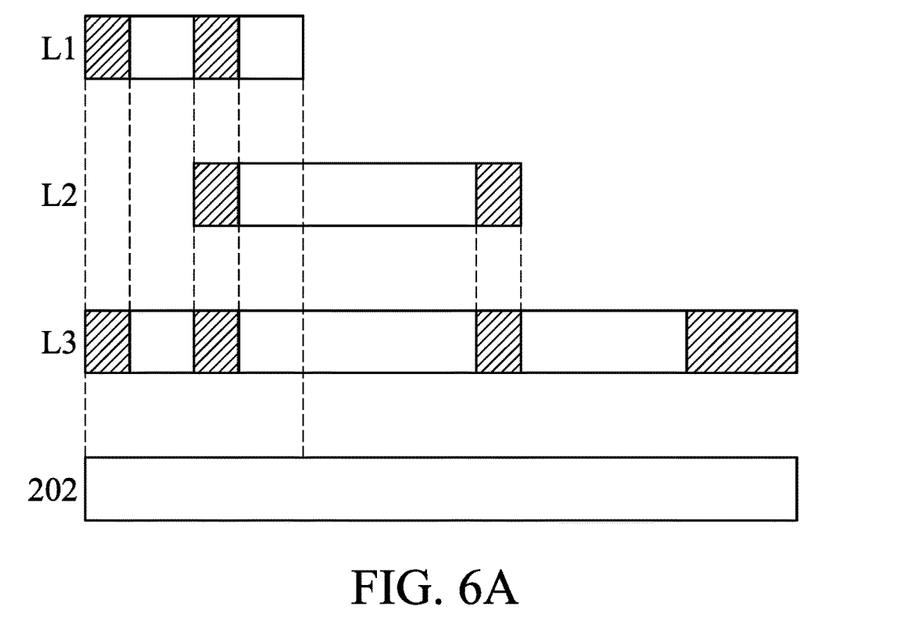
FIG. 6A and FIG. 6B illustrate the writing-back and invalidation performed by executing the instruction L1_WBINVD of the present application (or other instructions with similar functions)
Figure 6B:
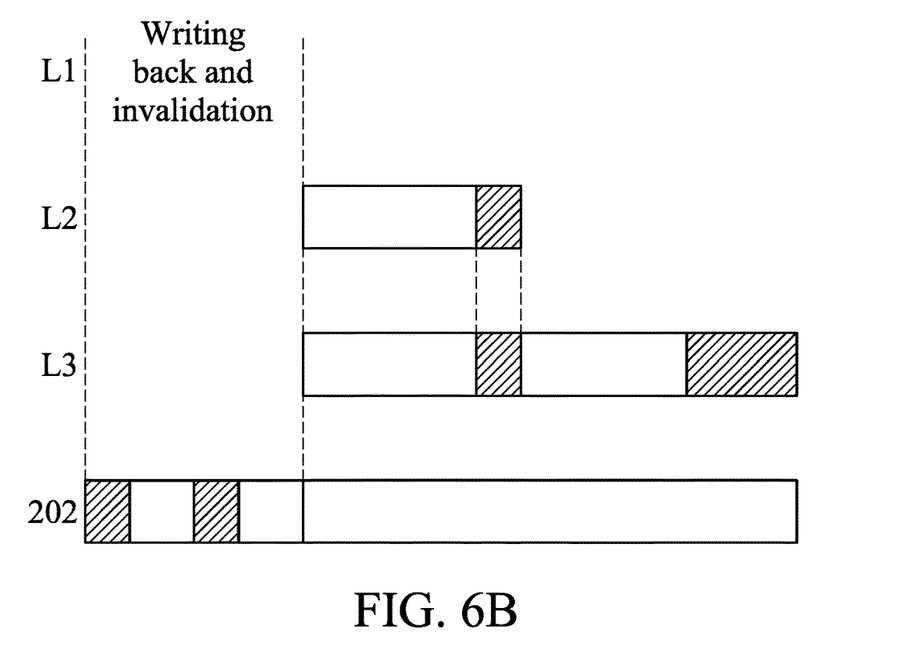

FIG. 6A and FIG. 6B illustrate the writing-back and invalidation performed by executing the instruction L1_WBINVD of the present application (or other instructions with similar functions). FIG. 6A marks the modified cache lines (in status 'M') by diagonal lines. After the core core_1 (including the first-level cache L1 and the second-level cache L2) executes the instruction L1_WBINVD, as presented in FIG. 6B, the modified cache lines related to the first-level cache L1 are written back to the system memory 202, and all cache lines (no matter modified or not) related to the first-level cache L1 are invalidated from the entire hierarchical cache system Cache_sys (completely invalidated from L1, L2 and L3 shown in the figures and completely invalidated from the in-core caches of the other cores not shown in the figures). In these figures, the third-level cache L3 is an inclusive-type cache which includes all cached data of its upper-level caches, and the second-level cache L2 is a non-inclusive and non-exclusive (NINE for short) cache. Note that the instruction L1_WBINVD of the present application (or other instructions with similar functions) is not limited to such a hierarchical cache architecture, and may be applied to various hierarchical cache architectures.

Next, the instruction CORE_WBINVD (or other instructions introducing the similar functions) is discussed, which regards the cached data in the first-level core L1 of the current core and the cached data in the second-level core L2 of the current core as the target to perform the writing-back and invalidation procedure.

Figure 7:
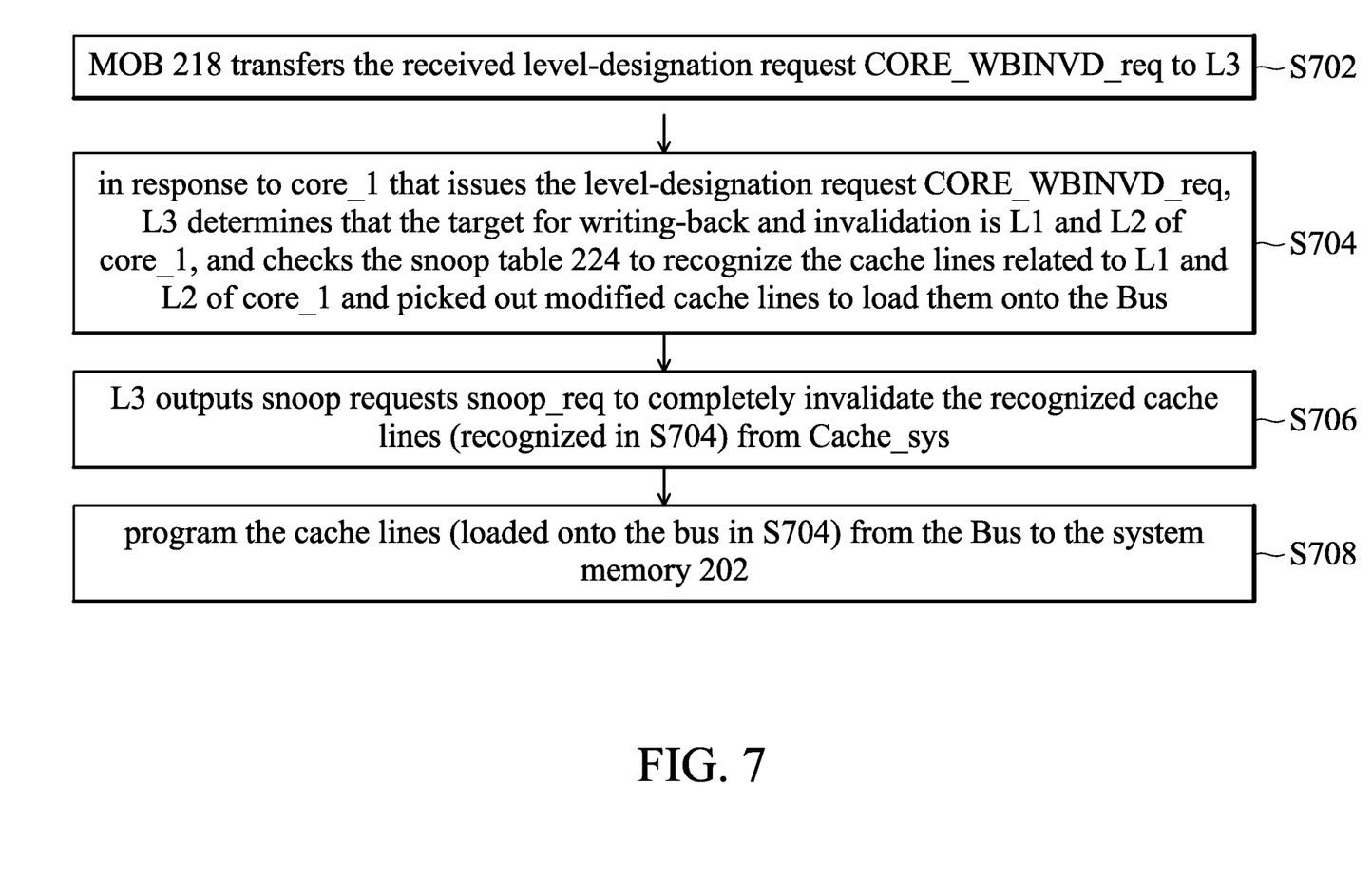
FIG. 7 is a flow chart illustrating a procedure that includes consulting a snoop table 224, for execution of the instruction CORE_WBINVD (or other, similar instructions)

FIG. 7 is a flow chart illustrating a procedure that includes consulting a snoop table 224 in order to execute the instruction CORE_WBINVD (or other, similar instructions). The microinstruction decoded from this instruction CORE_WBINVD includes issuing a level-designation request CORE_WBINVD_req. In the following discussion with reference to FIG. 2, the current core that initiates the instruction is the core_1 shown in FIG. 2.

In step S702, the memory order buffer (MOB) 218 transfers the received level-designation request CORE_WBINVD_req to the last-level cache L3.

In step S704, in response to the core core_1 that issues the level-designation request CORE_WBINVD_req, the last-level cache L3 determines that the target for writing-back and invalidation is the first-level cache L1 and the second-level cache L2 of the core core_1, and checks the snoop table 224. Referring to FIG. 3B, the column 302 about the core core_1 is checked. The cache lines related to the first-level cache L1 and the second-level cache L2 of the core core_1 are recognized, and modified cache lines are picked out from the recognized cache lines. Based on the information obtained from column 302 of FIG. 3B, the cache lines in the modified status ('M' status) are recognized, and loaded onto the bus, Bus, in the step S504.

In step S706, the last-level cache L3 outputs snoop requests snoop_req. In response to the snoop requests snoop_req, the cache lines recognized in step S704 as the target for writing-back and invalidation are completely invalidated from the hierarchical cache system Cache_sys (completely invalidated from all in-core caches of all cores, and completely invalidated from the last-level cache L3 which is share by the different core).

In step S708, the cache lines loaded onto the bus (Bus) in step S704 are further programmed from the bus (Bus) to the system memory 202.

Based on the cache statuses recorded in the snoop table 224 for the in-core caches of the different cores coer_1 to core_2, the procedure illustrated in FIG. 7 recognizes the target for writing-back and invalidation in response to the first core core_1, and performs writing-back and invalidation on the cache lines related to the in-core caches (L1 and L2) of the core core_1.

Figure 8:
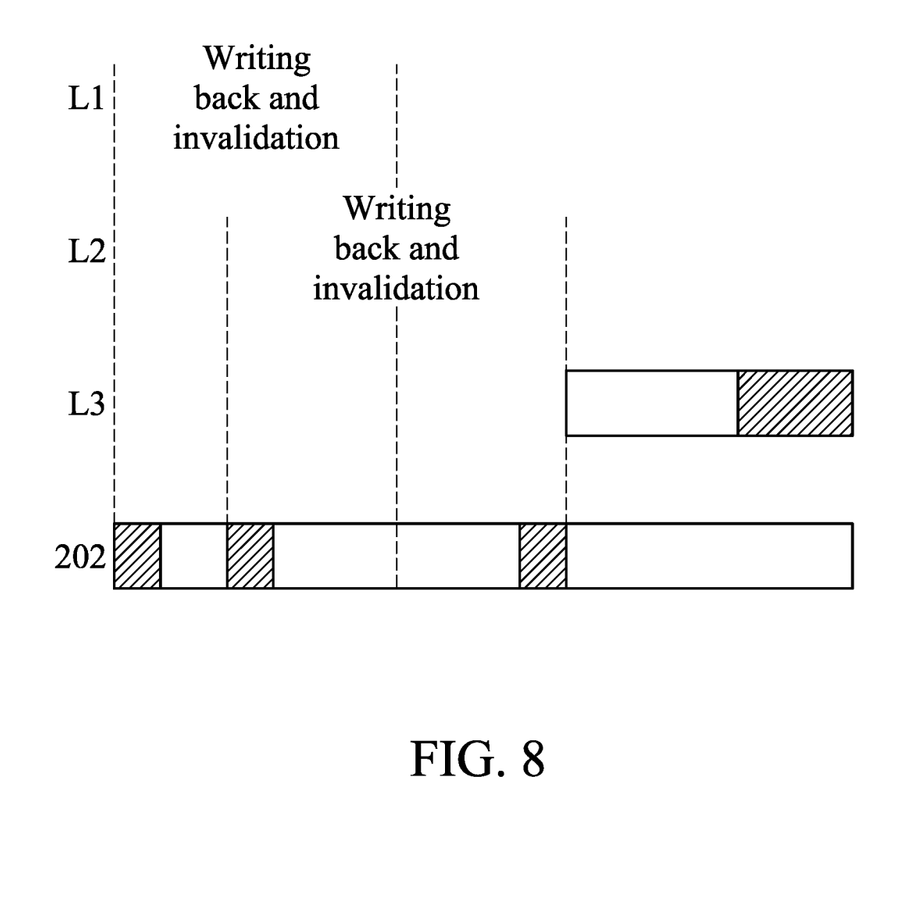
FIG. 8 illustrates the writing-back and invalidation performed by executing the instruction CORE_WBINVD of the present application (or other instructions with similar functions).

In comparison with FIG. 6A, FIG. 8 illustrates the writing-back and invalidation performed by executing the instruction CORE_WBINVD of the present application (or other instructions with similar functions). As presented in FIG. 8, the modified cache lines related to the first-level cache L1 or the second-level cache L2 of the current core are written back to the system memory 202, and all cache lines (no matter modified or not) related to the first-level cache L1 or the second-level cache L2 of the current core are invalidated from the entire hierarchical cache system Cache_sys (completely invalidated from L1, L2 and L3 shown in the figures and completely invalidated from the in-core caches of the other cores not shown in the figures).

Any multi-core processor using an ISA instruction, accompanying with hardware and microcode design, to designate an in-core cache (simply designating the first-level cache L1, or designating the first-level cache and second-level cache memories L1 and L2 both) within the current core as a target to perform writing-back and invalidation is within the scope of the present application.

While the application has been described by way of example and in terms of the preferred embodiments, it should be understood that the application is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A processor, designating an in-core cache of a hierarchical cache system to perform writing-back and invalidation of cached data, comprising:
a first core, including a decoder, a memory order buffer, and a first-level cache; and
a last-level cache, coupled to the first core;
wherein:
the hierarchical cache system includes the first-level cache of the first core, the last-level cache, and in-core caches of the other cores of the processor, and the last-level cache is shared by the different cores of the processor;
the decoder decodes an instruction into microinstructions, wherein the instruction is in an instruction set architecture and is executed to designate a designated-level cache within a current core as a target to perform writing-back and invalidation;
according to the microinstructions, a level-designation request indicating the designated-level cache within the first core is transferred to the hierarchical cache system through the memory order buffer; and
in response to the level-designation request, the hierarchical cache system recognizes cache lines related to the designated-level cache of the first core, writes modified cache lines, which are obtained from the recognized cache lines, back to a system memory, and then invalidates all the recognized cache lines from the hierarchical cache system.

2. The processor as claimed in claim 1, wherein:
the instruction designates the first-level cache of the first core as the designated-level cache.

3. The processor as claimed in claim 2, wherein:
in response to the level-designation request that is transferred to the hierarchical cache system through the memory order buffer, the first-level cache of the first core is driven to return memory addresses of cache lines cached in the first-level cache of the first core to the memory order buffer.

4. The processor as claimed in claim 3, further comprising:
a storage area outside the first core, recording a snoop table to show cache statuses in the different cores for each memory address,
wherein cache-status options include modified status, exclusive status, shared status, and invalid status.

5. The processor as claimed in claim 4, wherein:
in response to each memory address returned from the first-level cache of the first core, the memory order buffer issues a writing-back and invalidation request carrying the memory address to consult the snoop table;
based on a result of consulting the snoop table, snoop requests carrying the memory addresses are transferred to the hierarchical cache system;
in response to the snoop requests, the hierarchical cache system loads modified cache lines, which are in the modified status among snooped cache lines, onto a bus, and then invalidates all of the snooped cache lines from the hierarchical cache system, wherein the bus is configured for communication between the system memory and the processor; and
the modified cache lines loaded onto the bus are further programmed from the bus into the system memory.

6. The processor as claimed in claim 2, further comprising:
a storage area within the first core, which is a part of the hierarchical cache system and records an in-core cache table,
wherein:
the in-core cache table shows cache statuses in the first-level cache of the first core for the different memory addresses; and
cache-status options include modified status, exclusive status, shared status, and invalid status.

7. The processor as claimed in claim 6, wherein:
in response to the level-designation request, the hierarchical cache system consults the in-core cache table to recognize modified cache lines, which are in the modified status, from the first-level cache of the first core, and loads the modified cache lines onto a bus;
the bus is configured for communication between the system memory and the processor;
the hierarchical cache system further consults the in-core cache table to recognize and invalidate all cache lines related to the first-level cache of the first core; and
the modified cache lines loaded onto the bus are further programmed from the bus into the system memory.

8. The processor as claimed in claim 1, wherein:
the first core further comprises a second-level cache, which is a part of the hierarchical cache system;
the instruction designates the first-level cache as well as the second-level cache of the first core as the designated-level cache.

9. The processor as claimed in claim 1, further comprising:
a microcode storage device, storing microcode for the decoder to decode the instruction into the microinstructions.

10. The processor as claimed in claim 1, wherein:
the instruction designates the entire in-core cache structure of the current core as the designated-level cache.

11. The processor as claimed in claim 10, further comprising:
a storage area outside the first core, recording a snoop table to show cache statuses in the different cores for each memory address, wherein each memory address represents one cache line,
wherein cache-status options include modified status, exclusive status, shared status, and invalid status.

12. The processor as claimed in claim 11, wherein:
the level-designation request is transferred to the last-level cache through the memory order buffer;
in response to the first core that provides the level-designation request, the last-level cache determines that the designated-level cache includes the entire in-core cache structure of the first core, consults the snoop table to recognize modified cache lines which correspond to memory addresses in the modified status in the first core, and loads the modified cache lines onto a bus, wherein the bus is configured for communication between the system memory and the processor;
the last-level cache issues snoop requests to regard the entire in-core cache structure of the first core as the target, and performs invalidation; and
the modified cache lines loaded onto the bus are further programmed from the bus into the system memory.

13. A method for performing writing-back and invalidation of cached data by designating an in-core cache of a hierarchical cache system, comprising:
operating a first core of a processor to execute an instruction, wherein the instruction is in an instruction set architecture and is executed to designate a designated-level cache within a current core as a target to perform writing-back and invalidation, and the hierarchical cache system includes a first-level cache of the first core, a last-level cache coupled to the first core, and in-core caches of the other cores which share the last-level cache with the first core;
according to microinstructions decoded from the instruction, transferring a level-designation request to the hierarchical cache system through a memory order buffer of the first core, wherein the level-designation request indicates the designated-level cache of the first core; and in response to the level-designation request, operating the hierarchical cache system to recognize cache lines related to the designated-level cache of the first core, write modified cache lines, which are obtained from the recognized cache lines, back to a system memory, and then invalidate all the recognized cache lines from the hierarchical cache system.

14. The method as claimed in claim 13, wherein:
the instruction designates the first-level cache of the first core as the designated-level cache.

15. The method as claimed in claim 14, wherein:
in response to the level-designation request that is transferred to the hierarchical cache system through the memory order buffer, the first-level cache of the first core is driven to return memory addresses of cache lines cached in the first-level cache of the first core to the memory order buffer.

16. The method as claimed in claim 15, further comprising:
recording a snoop table in a storage area outside the first core, to show cache statuses in the different cores for each memory address,
wherein cache-status options include modified status, exclusive status, shared status, and invalid status.

17. The method as claimed in claim 16, wherein:
in response to each memory address returned from the first-level cache of the first core, the memory order buffer issues a writing-back and invalidation request carrying the memory address to consult the snoop table;
based on a result of consulting the snoop table, snoop requests carrying the memory addresses are transferred to the hierarchical cache system;
in response to the snoop requests, the hierarchical cache system loads modified cache lines, which are in the modified status among snooped cache lines, onto a bus, and then invalidates all of the snooped cache lines from the hierarchical cache system, wherein the bus is configured for communication between the system memory and the processor; and
the modified cache lines loaded onto the bus are further programmed from the bus into the system memory.

18. The method as claimed in claim 14, further comprising:
recording an in-core cache table in a storage area within the first core which is a part of the hierarchical cache system,
wherein:
the in-core cache table shows cache statuses in the first-level cache of the first core for the different memory addresses; and
cache-status options include modified status, exclusive status, shared status, and invalid status.

19. The method as claimed in claim 18, wherein:
in response to the level-designation request, the hierarchical cache system consults the in-core cache table to recognize modified cache lines, which are in the modified status, from the first-level cache of the first core, and loads the modified cache lines onto a bus, wherein the bus is configured for communication between the system memory and the processor;
the hierarchical cache system further consults the in-core cache table to recognize and invalidate all cache lines related to the first-level cache of the first core; and
the modified cache lines loaded onto the bus are further programmed from the bus into the system memory.

20. The method as claimed in claim 13, wherein:
the first core further comprises a second-level cache, which is a part of the hierarchical cache system;
the instruction designates the first-level cache as well as the second-level cache of the first core as the designated-level cache.

21. The method as claimed in claim 13, further comprising:
operating a decoder of the first core to decode the instruction into microinstructions based on microcode stored in a microcode storage device.

22. The method as claimed in claim 13, further comprising:
the instruction designates the entire in-core cache structure of the current core as the designated-level cache.

23. The method as claimed in claim 22, further comprising:
recording a snoop table in a storage area outside the first core, to show cache statuses in the different cores for each memory address, wherein each memory address represents one cache line, wherein cache-status options include modified status, exclusive status, shared status, and invalid status.

24. The method as claimed in claim 23, wherein:
the level-designation request is transferred to the last-level cache through the memory order buffer;
in response to the first core that provides the level-designation request, the last-level cache determines that the designated-level cache includes the entire in-core cache structure of the first core, consults the snoop table to recognize modified cache lines which correspond to memory addresses in the modified status in the first core, and loads the modified cache lines onto a bus, wherein the bus is configured for communication between the system memory and the processor;
the last-level cache issues snoop requests to regard the entire in-core cache structure of the first core as the target, and performs invalidation; and
the modified cache lines loaded onto the bus are further programmed from the bus into the system memory.

* * * * *